(12) United States Patent
Nishimura et al.

(10) Patent No.: US 6,263,254 B1
(45) Date of Patent: Jul. 17, 2001

(54) AUTOMATIC WORK ALLOTMENT SYSTEM FOR EDS FABRICATION MACHINES

(75) Inventors: Hisato Nishimura; Hidenobu Yamada, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/100,082

(22) Filed: Jun. 19, 1998

(30) Foreign Application Priority Data

Jun. 20, 1997 (JP) .................................................. 9-164252

(51) Int. Cl.[7] .................................................. G06F 19/00
(52) U.S. Cl. .................................................. 700/117; 700/97
(58) Field of Search .................................................. 700/117, 96, 97, 700/99, 100, 101, 102; 29/703, 729

(56) References Cited

U.S. PATENT DOCUMENTS

| | | | |
|---|---|---|---|
| 4,653,159 | * 3/1987 | Henderson et al. | 29/33 M |
| 4,677,734 | * 7/1987 | Bloch et al. | 29/564.2 |
| 4,701,007 | * 10/1987 | Jonca | 385/147 |
| 4,711,025 | * 12/1987 | DeSanto | 29/854 |
| 4,729,152 | * 3/1988 | Hammond et al. | 29/33 M |
| 4,803,778 | * 2/1989 | Cross | 29/857 |
| 5,153,839 | * 10/1992 | Cross | 700/112 |
| 5,325,304 | * 6/1994 | Aoki | 700/100 |
| 5,740,602 | * 4/1998 | Peterson et al. | 29/748 |
| 5,757,648 | * 5/1998 | Nakamura | 700/169 |
| 5,793,648 | * 8/1998 | Nagle et al. | 703/8 |

\* cited by examiner

*Primary Examiner*—William Grant
*Assistant Examiner*—Zoila Cabrera
(74) *Attorney, Agent, or Firm*—Finnegan, Henderson, Farabow, Garrett & Dunner, L.L.P.

(57) ABSTRACT

An EDS production system includes a material supply section for supplying electric wires and terminals, an EDS fabrication section having identified machines for processing electric wires to prefabricate circuits employable to fabricate EDS products, covering work regions for cutting electric wires in lengths, for stripping cut wires of insulating covers over lengths at either wire end or both wire ends and for applying terminals to stripped wire ends, and a production control section for controlling quantities of circuits to be prefabricated by completion dates therefor in consideration of quantities of ordered EDS products to be completed within delivery terms thereof, a master controls data on specifications for the electric wires, a combination of masters control data on specifications for the performances and work regions of the identified machines, and a processor processes a combination of data from the respective masters and data from the production control section covering the circuit quantities and the completion dates, to have allotted, to the identified machines, fractions of an entirety of circuit fabrication work to be done within an arbitrary time section in a concerned term to provide necessary types of circuits in required quantities by specified completion dates.

11 Claims, 9 Drawing Sheets

FIG.3

| STRIP LENGTH MASTER | |
|---|---|
| TERMINAL NO. | STRIP LENGTH |
| 71142631 | 0 |
| 7017101002 | 0 |
| 71142630 | 0 |
| 71144021 | 0 |
| 7116125702 | 0 |
| 71162640 | 0 |
| 71162641 | 0 |
| 71164020 | 0 |
| 71164021 | 0 |

FIG.4

| WIRE MASTER | | |
|---|---|---|
| DESCRIPTION | SIZE | COLOR |
| AVS | 0.5 | |
| ACCA | 0.85 | |
| AVS | 0.3 | |
| AVS | 0.5 | |
| AVS | 0.85 | |
| AVS | 1.25 | |
| CAVS | 0.3 | |
| CAVS | 0.5 | |
| CAVS | 0.85 | |
| DOREN | 8F | |
| AVSS | 0.85 | |
| AVSS | 1.25 | |

FIG.5

| TERMINAL MASTER |
|---|
| TERMINAL NO. ▲ |
| ▶ 7116168502 |
| 7116168602 |
| 71162640 |
| 7116241 |
| 71164020 |
| 71164021 |
| 7B16129908 |
| 7009198802 |
| 71144020 |
| 71144021 |
| 7116125702 |
| 7116129802 |
| 7116286602 |
| 71163190 |
| 71163191 |
| 71164025 |
| ✻                          ▼ |

FIG.6

WIRE LENGTH: Min 1 mm ~ Max 9999 mm

Q'TTY: 1 ~ 1000

UPPER LIMIT: 10000 /DAY

FIG.7

| | PRODUCT NO. | ORDERED Q'TTY | PREFAB. DATE | LOTS NO. | CHECK |
|---|---|---|---|---|---|
| ▶ | AAA | 100 | 1997/05/20 | 1 | |
| | BBB | 100 | 1997/05/20 | 1 | |
| | · | 100 | 1997/05/20 | 1 | |
| | · | | | | |

FIG.9
CIRCUIT "A" 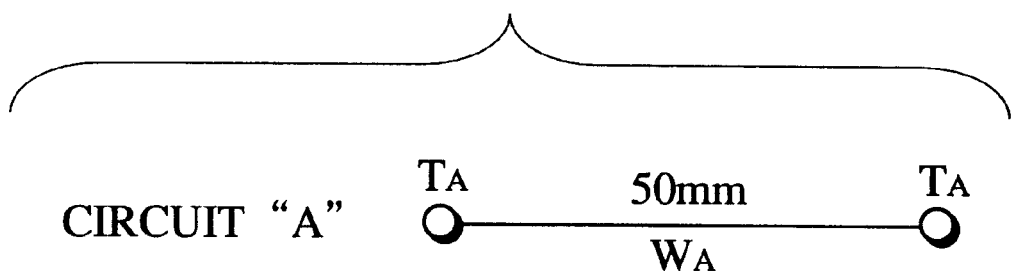
CIRCUIT "B" 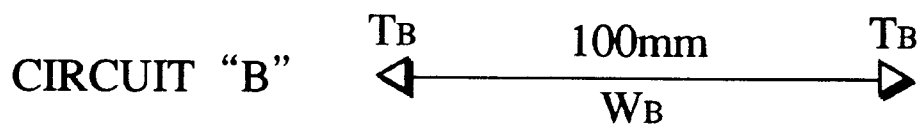
CIRCUIT "C" 

| PRODUCT NO. | COMP. NO. | LOTS NO. | ORDERED Q'TTY | PREFAB. DATE |
|---|---|---|---|---|
| AAA | 7 | 1 | 200 | 97/05/21 |
| BBB | 9 | 1 | 200 | 97/05/21 |
| | 24 | 1 | 200 | 97/05/21 |
| | 6 | 1 | 200 | 97/05/20 |
| | 12 | 1 | 200 | 97/05/20 |
| | 7 | 1 | 200 | 97/05/20 |
| | 9 | 1 | 200 | 97/05/20 |
| | 24 | 1 | 200 | 97/05/20 |
| | 28 | 1 | 200 | 97/05/20 |
| | 31 | 1 | 200 | 97/05/20 |
| | 32 | 1 | 200 | 97/05/20 |
| | 43 | 1 | 200 | 97/05/20 |
| | 44 | 1 | 200 | 97/05/20 |
| | 61 | 1 | 200 | 97/05/20 |
| | 66 | 1 | 200 | 97/05/20 |
| | 67 | 1 | 200 | 97/05/20 |

TOTAL 0

SHIFT      CANCEL

LOAD BALANCE <97/05/20>

MACHINE NOS.

AUTOMATIC WORK ALLOTMENT SYSTEM FOR EDS FABRICATION MACHINES

BACKGROUND OF THE INVENTION

1. Field of the Invention

The present invention relates to a work allotment system for automatically determining respective quantities of various work to be allotted to a number of diverse available EDS (electrical distribution system, hereafter sometimes called "wiring harness") fabrication machines in consideration of specified particulars for individual circuits to be prefabricated by or in the machines for fabrication of required EDS products, as well as conditions and performances of the machines.

2. Description of Relevant Art

Automobiles employ various types of EDS, which typically comprise assemblies of electric wires amounting to several hundreds to about one thousand in wire number, ranging about several tens of centimeters in wire length. Such wires have their desirable lengths and desirable termination figures set through a prefabrication process including three steps: a cutting step in which an electric wire wound on a roll is unrolled straight and cut in a desirable wire length; a stripping step in which the cut wire is stripped along a desirable strip length of an insulation cover at either or both of its ends; and a crimping or solder-less connection step in which a desirable terminal is attached to the stripped wire end. After such a prefabrication, respective wires have their connectors fixed thereto as well as their housings fitted thereon, and are arranged in their desirable layout patterns different by automobiles and assembled, as necessary, to provide complete EDS products. Each wire constitutes a single circuit in any EDS that may include 1000 or more circuits. Some circuits may have accessories such as a conduit or tube fitted thereon, when prefabricated.

In usual, the fabrication of an EDS comprises a "lot production" including the prefabrication process in which a variety of electric wires are cut in lengths and cut wires are stripped at their ends and terminated by solder-less terminals, and a "set production" in which prefabricated circuits are assembled. The lot production is automated by a number of available EDS fabrication machines different in function and/or performance, covering varieties of work fields in the prefabrication process.

In a conventional system, an eventual number of various EDS order reception sheets at a factory were analyzed by technical staffs to know respective numbers of necessary circuits to be prefabricated, and associated data were collected and listed to be printed in the form of circuit-level order reception tables, which were analyzed by an expert of EDS work allotment, who determined respective daily quantities of circuit prefabrication work to be allotted to a limited number of available EDS fabrication machines, by reference to printed books describing technical characteristics of the machines, such as applicable wire types, terminal types and circuit accessories. Then, for each EDS fabrication machine, an allotted quantity of work was specified in a printed EDS fabrication instruction book prepared for a daily service of the machine.

A very simplified situation is now supposed, for example, such that a total of three different machines are available for a lot production of a total of three types of circuits that are necessary for a set production of required quantities of two or more wiring harness assemblies for promised ex-factory dates, which may be today and tomorrow. A first machine is adaptive for the prefabrication of each of an A-type and a B-type circuit, a second machine, simply for the B-type circuit, and a third machine, for any of the A-type, the B-type and a C-type circuit. The three machines have their production rates individually variable by the circuit types. Further, for the three types of circuits, required quantities are different. Still more, the set production of any wiring harness assembly cannot start until necessary lot quantities of the three types of circuits have become available therefor.

For such an EDS fabrication work allotment service, even a skilled person took much time. Still less, any person on the way of a long training might have, not merely a wasted time, but also an inefficient allotment, incurring a reduced EDS productivity.

SUMMARY OF THE INVENTION

The present invention has been achieved with such points in view.

It therefore is an object of the present invention to provide an automatic work allotment system for EDS fabrication machines, permitting a relatively short training to effect an adequate work allotment for an increased EDS productivity in an inexpensive manner.

It also is an object of the invention to provide the automatic work allotment system in the form of a software program stored in an available storage medium, permitting a processor to execute an efficient work allotment.

To achieve the object, a first aspect of the invention provides an automatic work allotment system for an EDS (electrical distribution system) production system including a material supply section for supplying a plurality of types of electric wires and a plurality of types of terminals, an EDS fabrication section for fabricating a plurality of kinds of EDS products, the EDS fabrication section having a plurality of identified machines each adaptive for one or more performances to automatically execute one or more sub-regions of a work region for processing one or more types of electric wires to prefabricate one or more types of circuits employable, alone or in combination, to fabricate one or more kinds of EDS products, the one or more sub-regions of the work region including one of a first sub-region for cutting one or more specified types of electric wires in a variable wire length, a combination of the first sub-region and a second sub-region for stripping a cut wire of an insulating cover thereon over a variable strip length at one of either end and both ends thereof, and a combination of the first sub-region, the second sub-region and a third sub-region for applying a specified terminal to a stripped end of the cut wire, and a production control section for controlling a circuit quantity of a respective type of circuit to be prefabricated by a specified completion date therefor in consideration of a production quantity of a respective ordered EDS product to be completed within a delivery term thereof, the automatic work allotment system comprising a first master for controlling a first set of data on specifications for the plurality of types of electric wires, one or more second masters for controlling a second set of data on specifications for the one or more performances and the one or more sub-regions of the work region of each identified machine, and a processor cooperative with the first and second masters and the production control section for processing a combination of a subset of the first set of data, a subset of the second set of data and a third set of data covering the circuit quantity of the respective type of circuit and the specified completion date therefor to have allotted, to the plurality of identified machines, a plurality of fractions of an entirety of circuit fabrication work to be done within an arbitrary one of time sections of a concerned term to provide one or more necessary types of circuits in required circuit quantities by specified completion dates therefor, respectively.

According to the first aspect of the invention, a processor, which may be a personal computer, receives necessary data from first and second masters which may be programmed files, and from a production control section which may have a host computer. The processor processes the received data to calculate a quantity of an entirety of circuit fabrication work to be done within an arbitrary one of time sections, such as working days, of a concerned term that may be a delivery term, and automatically allots fractions of the entire quantity of circuit fabrication work to a plurality of identified machines that may be circuit prefabrication machines or EDS fabrication lines, thus permitting a relatively short training of a fresh person to effect an adequate work allotment for an increased EDS productivity in an inexpensive manner.

According to a second aspect of the invention, the one or more sub-regions of the work region further include a fourth sub-region interrupting work in one of the first, second and third sub-regions and a combination thereof, with a delay for applying an accessory to a semi-prefabricated circuit.

According to the second aspect of the invention, a prefabrication completion date is set in consideration of a delay for application of a particular accessory, such as for manual application of a waterproof plug or manual insertion of a tube.

According to a third aspect of the invention, the entirety of circuit prefabrication work is defined in terms of a total of respective numbers of circuits of the one or more necessary types of circuits to be prefabricated within the arbitrary time section.

According to the third aspect of the invention, a processor calculates a total of respective numbers of circuits of one or more necessary types of circuits to be prefabricated within an arbitrary time section, as an entirety of circuit prefabrication work, allowing for a facilitated grasp of a quantity of entire necessary work.

According to a fourth aspect of the invention, the plurality of identified machines include a first identified machine adaptive for fabricating a first number of circuits within the arbitrary time section, and a second identified machine adaptive for fabricating a second number of circuits within the arbitrary time section, and the processor allots to the first identified machine the first number of circuits as a first fraction of the entirety of circuit fabrication work, before allotting to the second identified machine a number of circuits as a second fraction of the entirety of circuit fabrication work.

According to the fourth aspect of the invention, an entirety of necessary circuit fabrication work defined in terms of a circuit number is apportioned to a plurality of identified machines in a one-side cramming manner, permitting a comprehensive algorithm to be employed, allowing for an easy visualized man-machine re-allotment on a work quantity histogram display.

According to a fifth aspect of the invention, the plurality of identified machines include a first identified machine adaptive for fabricating a first number of circuits of a first type of circuit within the arbitrary time section, and a second identified machine adaptive for fabricating a second number of circuits of the first type of circuit within the arbitrary time section, and the processor allots the first number of circuits of the first type of circuit to the first identified machine, before allotting a number of circuits of the first type of circuit to the second identified machine.

According to the fifth aspect of the invention, a total number of circuits of a respective necessary type of circuit are allotted for their prefabrication in a sequentially cramming manner to a plurality of identified machines, permitting a delicate re-allotment on a display that may provide a plurality of component-wise color-coded work quantity histograms each having a column component representative of a work region for prefabricating the necessary type of circuit.

According to a sixth aspect of the invention, the first master comprises a first set of program files, the one or more second masters comprise a second set of program files, the processor comprise a third set of program files, and the automatic work allotment system further comprises one or more storage media for storing therein the first, second and third sets of program files.

According to the sixth aspect of the invention, the automatic work allotment system can operate on a computer.

Moreover, to achieve the object described, a seventh aspect of the invention provides an automatic work allotment system for allotting fabrication instructions obtained by developing input order data to a plurality of EDS (electrical distribution system) fabrication machines for fabricating in lots a plurality of kinds of electric wires to constitute EDS products, the automatic work allotment system comprising a wire specification master for storing specified data on a variety of kinds of electric wires constituting the EDS products, a machine master having registered wire numbers and terminal numbers set to the plurality of EDS fabrication machines and performance values thereof, a strip length master having registered strip lengths in correspondence to the terminal numbers, and a work allotment processor for preparing fabrication instructions on a circuit basis to the plurality of EDS fabrication machines in accordance with a combination of numbers of input orders by product numbers and an input prefabrication completion date, wire specification data registered to the wire specification master, data registered to the machine master, and data registered to the strip length master.

According to an eighth aspect of the invention, the automatic work allotment system further comprises a cutting priority circuit master for storing circuit configurations needing more than a usual number of days between from a wire cutting to a prefabrication completion, numbers of working days therefor, and termination conditions of work to be done by cutting machines provided for the plurality of EDS fabrication machines and to be set as one of "terminal solder-less connection", "up to stripping" and "up to cutting", and the work allotment processor for preparing the fabrication instructions on the circuit basis to the plurality of EDS fabrication machines in accordance with the combination of the numbers of input orders by product numbers and the input prefabrication completion date, the data registered to the machine master, the data registered to the strip length master, and the circuit configurations, the numbers of working days and the termination conditions registered to the cutting priority circuit master.

According to a ninth aspect of the invention, the automatic work allotment system further comprises a display processor for graphically displaying the fabrication instructions allotted by the work allotment processor to the plurality of EDS fabrication machines to visualize a load balance.

Further to achieve the object described, a tenth aspect of the invention provides a storage medium with a stored automatic work allotment program including a circuit development process function for determining a number of orders, a prefabrication completion date and information on a lot number, respectively on a circuit basis, in accordance with input orders and wire specifications for a variety of electric wires constituting EDS (electrical distribution system) products, a strip length decision process function for determining strip lengths of respective terminals with reference to a strip length master, a termination condition decision process function for setting conditions of work to be done by cutting machines provided for a plurality of EDS fabrication machines as one of "terminal solder-less connection", "up to stripping" and "up to cutting", a cutting date calculation process function for calculating cutting dates of respective electric wires in accordance with the determined prefabrication completion dates and termination conditions, and a work allotment process function for preparing fabrication instructions on a circuit basis to the plurality of EDS fabrication machines in accordance with the calculated cutting dates and data on electric wires, terminals and accessories to be handled by machine types and respective machines registered to a machine master.

According to an eleventh aspect of the invention, the storage medium with the stored automatic work allotment program further has a display process function for graphically displaying the fabrication instructions to the plurality of EDS fabrication machines to visualize a load balance.

According to any of the seventh to eleventh aspects of the invention, electric wires and terminal numbers set to respective facilities are registered to a machine master, thereby permitting fabrication instructions to be automatically allotted. Moreover, fabrication instructions for each facility are graphically displayed, allowing for facilitated load balance control. Further, there is allowed a relatively short and exact work allotment, without skilled persons.

Furthermore, contrary to the conventional system in which no load balance could be observed before a delivery of fabrication instructions, the invention enables a load balance to be foreseen before fabrication instructions are delivered, thus permitting an optimal work allotment to EDS fabrication machines, resulting in an increased productivity.

Yet more, there can be given instructions by a simple flag setting process, such as for a defined work region, "up to a stripping" or "up to a solder-less terminal connection", in accordance with an order, permitting a current work allotment to be selected on a machine basis in consideration of a performance.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 3 is a table of data under control of a strip length master of the automatic work allotment system of FIG. 1;

FIG. 4 is a table of data under control of a wire master in a machine master of the automatic work allotment system of FIG. 1;

FIG. 5 is a table of data under control of a terminal master in the machine master;

FIG. 6 is a format of data under control of a performance master in the machine master;

FIG. 7 is a format of an order input screen of the automatic work allotment system of FIG. 1;

FIG. 9 is an illustration of typical data developed on a circuit basis from an input order in the automatic work allotment system of FIG. 1;

DETAILED DESCRIPTION OF THE PREFERRED EMBODIMENTS

Figure 1:
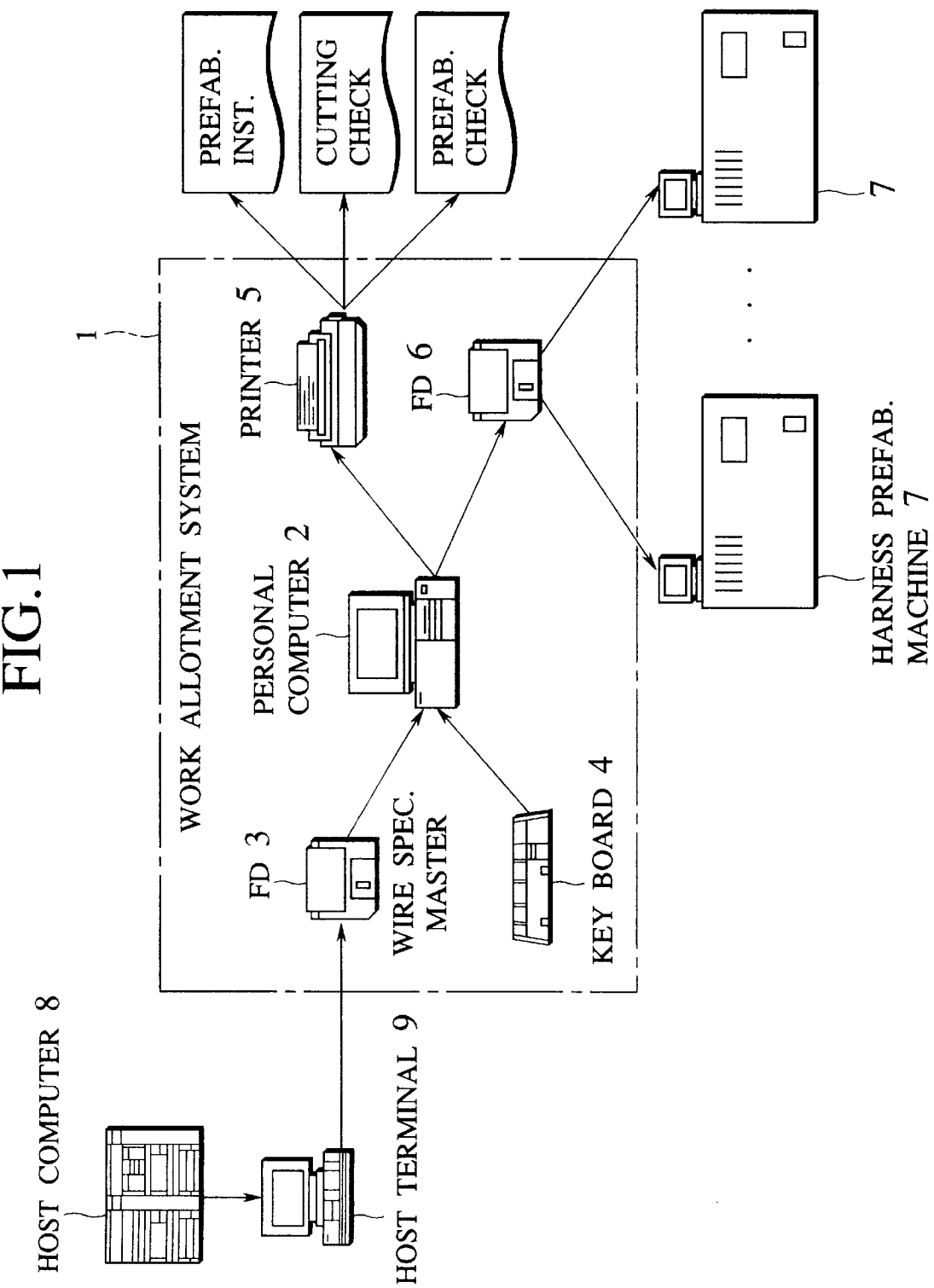
FIG. 1 is a block diagram of a hardware constitution of an automatic work allotment system according to an embodiment of the invention.

There will be detailed below the preferred embodiments of the present invention with reference to the accompanying drawings. Like members are designated by like reference characters.

Figure 2:
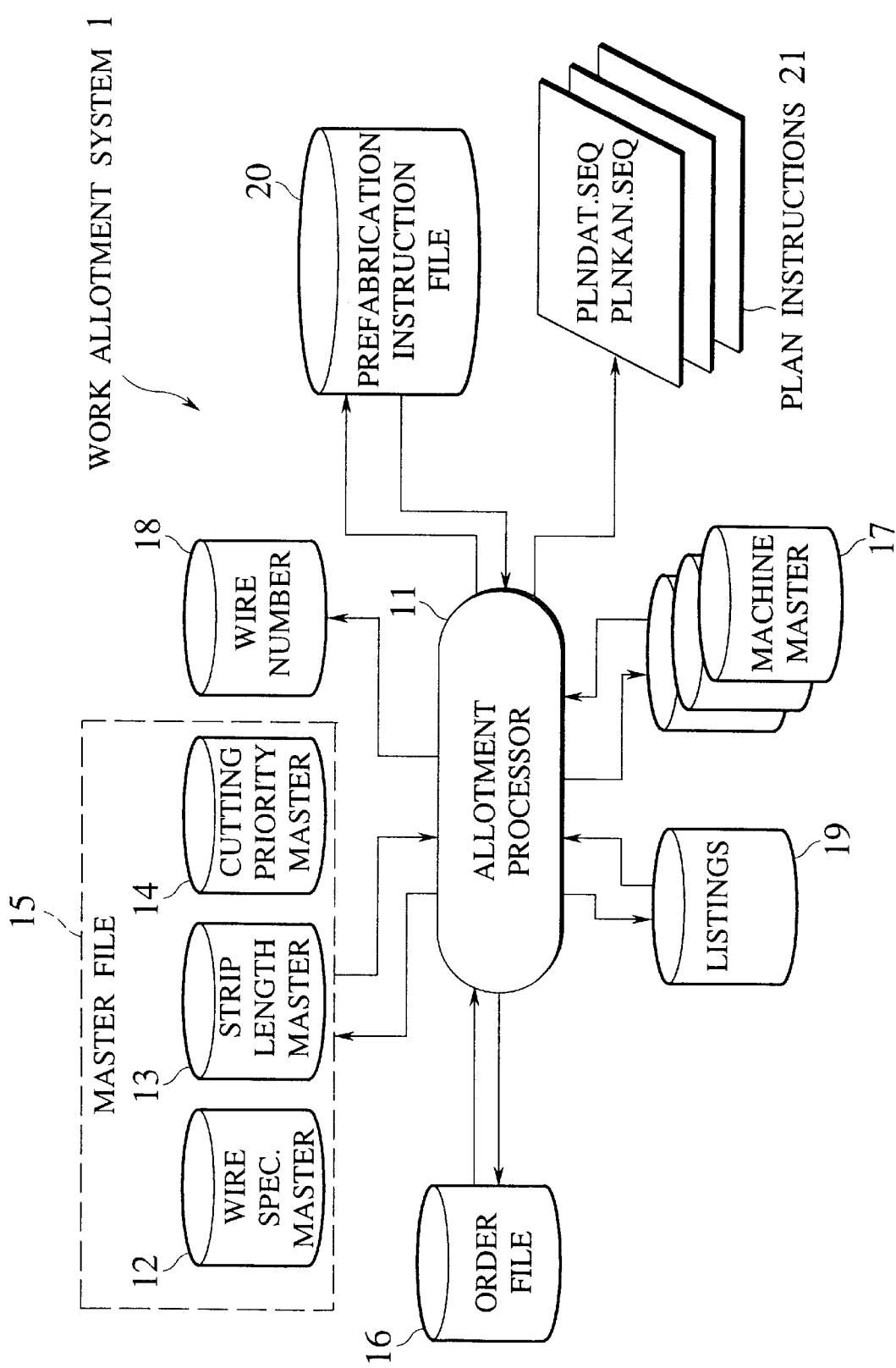
FIG. 2 is a block diagram of a software constitution of the automatic work allotment system of FIG. 1.

FIG. 1 shows a hardware constitution of an automatic work allotment system according to an embodiment of the invention, and FIG. 2, a software constitution of the same.

In the figures, designated at reference numeral 1 is the automatic work allotment system according to the embodiment, which is embodied for an EDS production system of an EDS manufacturer's large-scale factory including a "material supply section", an "EDS fabrication section" and a "production control section".

The "material supply section" supplies a variety of types of electric wires wound in rolls, a variety of types of solder-less bonding terminals, and a variety of types of circuit accessories such as synthetic resin tubes and conduits. Supplied goods are automatically and/or manually distributed to the EDS fabrication section, where they are fed to a variety of types of EDS (or wiring harness) prefabrication modules. Supply goods distributors and feeders are relatively small in sectional size and supposed as front-stage parts of the prefabrication modules.

The "EDS fabrication section" is equipped with a plurality of identified EDS fabrication machines for fabricating various kinds of EDS products, such as well-known electrical junction boxes for automobiles, each comprised of a set of prefabricated circuits connected through applied connectors, assembled as necessary, sometimes supported by or through a resin body and/or contained in a casing. The prefabricated circuits each comprise a single electric wire (cf. FIG. 9) cut in a specified wire length, sometimes stripped of a specified strip length of an insulation cover at either end or both ends, and sometimes applied with one or more terminals and/or accessories.

The EDS fabrication machines each comprise a number of automatic and/or manual production lines arranged in series and/or parallel, sometimes crossed (between EDS fabrication machines), including one or more circuit prefabrication gates each comprising one of the variety of types of EDS prefabrication modules. The one or more circuit prefabrication gates are assembled to constitute, or controlled as, one of a total number of EDS prefabrication machines 7 (FIG. 1) identified by a serial number in the EDS fabrication section.

The serial number may thus be identical to an identification number of an associated EDS fabrication machine.

Accordingly, each identified EDS fabrication machine (more specifically, a combination of EDS prefabrication module(s) belonging thereto and/or later-described interrupting line) is adaptive for one or more performances to automatically execute one or more sub-regions of a work region for processing one or more types of supplied electric wires to prefabricate one or more types of circuits (cf. FIG. 9) employable, alone or in combination, to fabricate one or more kinds of EDS products. The work region consists of a first sub-region for cutting one or more specified types of electric wires in specified wire lengths that may vary, a second sub-region for stripping a cut wire of an insulating cover thereon over (a) specified strip length(s) at one of either end and both ends thereof, while the strip length(s) may vary, a third sub-region for applying a specified terminal to a stripped end of the cut wire, and a fourth sub-region for applying a specified accessory or accessories to a semi-prefabricated circuit after work of the second or third sub-region.

Some EDS fabrication machines each include a manual or semi-manual line, e.g. for application of a waterproof plug or tube to a semi-prefabricated circuit, that interrupts an automatic prefabrication process and needs an interval of one or more days to be added to a standard term for completion of automatic prefabrication. In this case, the fourth sub-region covers work at the interrupting line.

The one or more sub-regions to be executed by the identified EDS fabrication machine depend on the type(s) of contributing EDS prefabrication module(s) and interrupting line(s), covering at least one of the first sub-region, a combination of the first and second sub-regions, and a combination of the first, second and third sub-regions.

The "production control section" has a whole-purpose host computer 8, a plurality of host terminals 9 connected to the host computer 8, while some terminals 9 are disposed in the material supply section and the EDS production section for data entry and data communications, and a sufficient number of operators and staffs for executing necessary services, and covers various work such as for reception of orders for the various kinds of EDS products, computerized analyses of received orders, and production control of the respective EDS products. All data on the received orders are automatically and/or manually input via host terminals 9 to the host computer 8, including delivery conditions of each ordered type of EDS product, such as an ex-factory date and time, quantities in lot and number, and particular description. The host computer 8 analyze input data to determine in number a circuit quantity of a respective type of circuit to be prefabricated in the EDS production section, by a completion date the computer 8 has adequately setup therefor, in consideration of a production quantity of a respective ordered EDS product to be completed well before the ex-factory time within a delivery term thereof.

The automatic work allotment system 1 is constituted with a personal computer 2 having a display thereon, a key board 4, a printer 5, etc. (in hardware of FIG. 1), including a principal processor 11 (in software of FIG. 2) called "work allotment processor", which reads therein necessary data, such as of a wire specification master 12 and a number of identified machine masters 17, from one or more floppy discs 6 carrying defined data stored therein from the host computer 8, or directly via a communication line of a host terminal 9, executes routines for work allotment, and outputs resultant data to the display and an associated monitor, responding to keyboarded or transmitted commands to print out formatted hard copies such as a fabrication instruction book covering prefabrication instructions, cutting check sheets and prefabrication check sheets, for possible reviews and corrections for voluntary re-allotment. With a final decision on work allotment, the computer 2 operates a disc drive to store a set of fabrication instructions with formatted allotment data in one or more floppy discs 6 to be delivered to a controller of a respective identified EDS fabrication machine having its EDS prefabrication machine 7, or transmits a combination of corresponding instructions and data via a direct communication line to the controller and/or the EDS prefabrication machine 7.

The stored data in the floppy discs 3 are copied from a set of data controlled by the host computer 8, via a nearest one of the host terminals 9, and are read into the personal computer 2, where they are converted in conformity with system formats. The nearest host terminal 9 may eventually stop servicing, when one can manually input necessary data to the personal computer 2 from the key board 4.

The work allotment processor 11 comprises a subset of a set of programs stored in a memory of the personal computer 2, which programs may be stored in a portable storage medium such as a floppy disc. The stored set of programs has a number of subsets constituting a master file 15 for controlling the wire specification master 12, a strip length master 13 and a cutting priority circuit master 14, an order file 16 for controlling input order data, a machine master file for controlling the number of identified machine masters 17 read from the floppy discs 3 to be stored by the machine types and machine numbers, a wire number file 18 for controlling data on numbers of circuits, a listing file 19 for controlling data on various listings, and a fabrication instruction file 20 (hereafter sometimes referred to as "pre-fabrication instruction file") for controlling fabrication instructions including necessary prefabrication instructions to be prepared for storage such as to the floppy discs 6.

There will be described below the four masters 12–14, 17 and the order file 16.

The wire specification master 12 controls, for each type or description code number (hereafter simply "code") of EDS product, various data on specifications for each circuit to be prefabricated at any circuit prefabrication module of any EDS prefabrication machine, such as electric wire name or code and size, terminal code(s), accessory code(s), and tube code and size, and can provide any combination of specified data for any EDS product code.

The strip length master 13 controls data on specifications for a strip length for each terminal code, as illustrated in part of an exemplary screen shown in FIG. 3.

Each machine master 17 controls data on (an) available performance(s) of and circuit specifications for an identified EDS fabrication machine, including those of an associated EDS prefabrication machine, covering a production capacity and rate for each available work region and codes of each electric wire, terminal, accessory and/or tube that any associated EDS prefabrication module can handle. For effective data control, the machine master 17 has a number of subsidiary masters such as a circuit or wire master partially illustrated in FIG. 4, a terminal master partially illustrated in FIG. 5, and a performance master partially illustrated in FIG. 6.

The cutting priority circuit master 14 controls data on specifications for particular circuit configurations needing more than one day for whole work between from a cutting to completion of prefabrication, due to interrupting work such as for application of a waterproof plug or tube, and includes data on the circuit configuration, one or more associated priority conditions, and a number of termination flags to be registered to define a work region at a cutter in consideration of (a) terminal(s) to be connected to a circuit in concern.

The priority conditions include a condition defined in terms of a number of days necessary for the interrupting work to be done at (a) different line(s), including e.g. a manual line for application of a solder-less terminal, requiring an electric wire to be cut in length earlier than for a typical circuit to be prefabricated with terminals automatically applied on both ends. Such a priority condition may be defined in terms of a total number of days necessary for completion of circuit prefabrication.

The termination flags are four or more in total, including: a flag "4" for the first sub-region of the work region, i.e. a wire cutting; a flag "Z" for the combination of the first and second sub-regions, i.e. up to a stripping; and a flag "2" for the combination of the first, second and third sub-regions, i.e. up to a terminal application. For example, a circuit may be required to have at both ends particular terminals to be each manually crimped and covered with a tube. For such a circuit, an electric wire is cut in length and stripped at both ends by an EDS prefabrication machine 7, before a transfer to a separate line for manual work, and the flag "Z" will be set.

The order file 16 controls data on specifications for ordered EDS products, including product code, product quantity, and prefabrication completion date, as partially illustrated by FIG. 7.

There will be described below various actions of the work allotment system 1 for an exemplary allotment of work to a total of three available EDS fabrication machines having a first, a second and a third identified EDS prefabrication machine 7 (hereafter sometimes referred to as "machine nos. 01, 02, 03").

Figure 8:
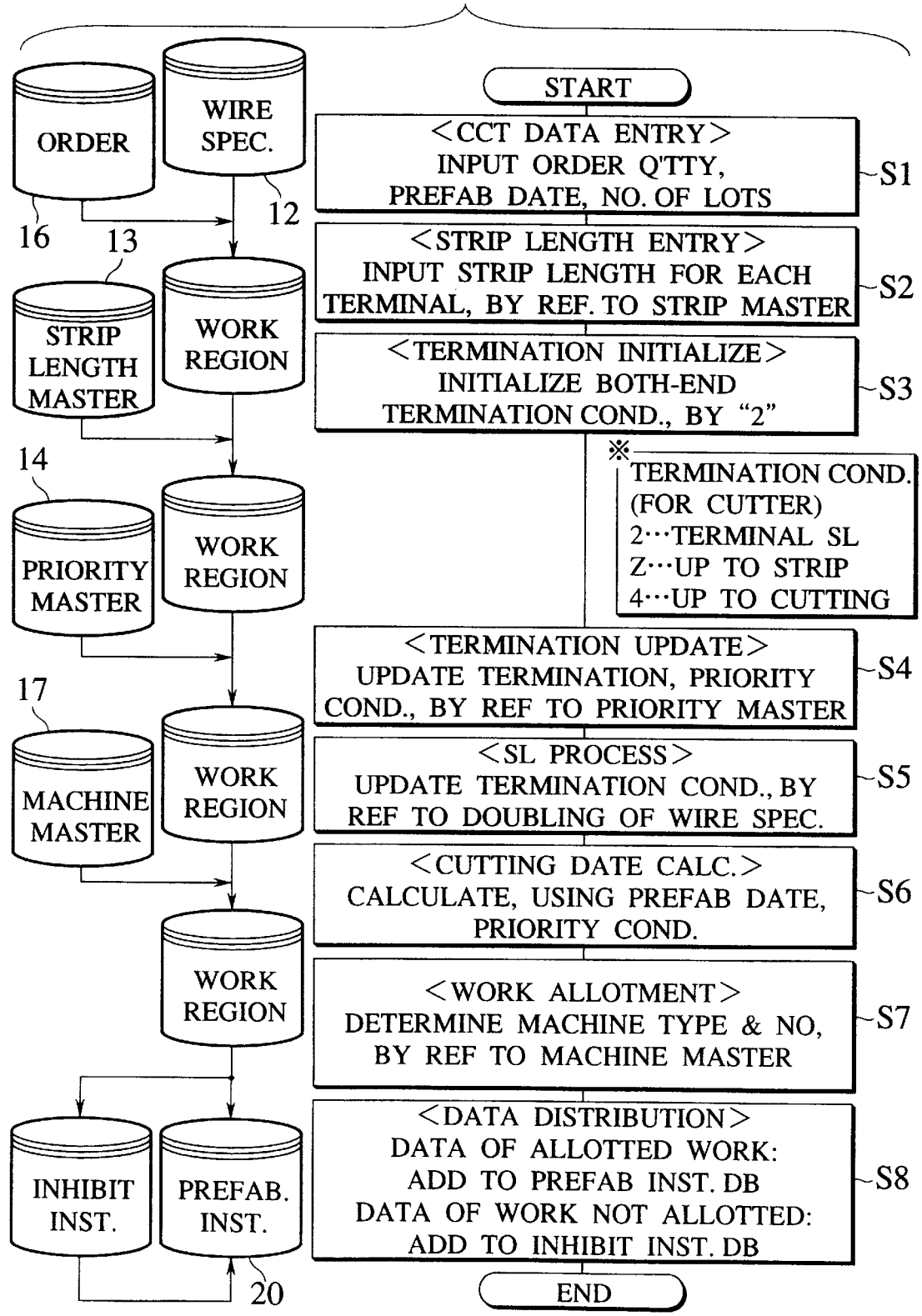
FIG. 8 is a control flow chart of the automatic work allotment system of FIG. 1.

FIG. 8 shows a control flow of the work allotment system 1.

At a step S1 (order entry, analysis for order data development into circuit data, circuit data entry), the personal computer 2 receives a set of current order data entered or input thereto, including ordered product codes, product quantities in lot and number and ex-factory dates, e.g. in the form of a context "(a total of) . . . EDS (products of a code) . . . for (a) . . . (type automobile) of (a) . . . (motor company,) by (an ex-factory date) . . ." or in a format of the order file 16, together with current circuit data developed from the order data by the host computer 8, accompanying authorized or computed prefabrication completion dates. Received data are reformatted to be stored as data for an associated work region, like other illustrated steps.

The circuit data may be developed from the received order data at the end of the personal computer 2, by analyzing contents of concerned orders formatted for control under the order file 16, specifying data on necessary circuits, with reference to the wire specification master 12 and in consideration of informed prefabrication completion dates. For example, analyses on an order of EDS products for a type of automobile may define a situation illustrated in FIG. 9, needing a total of 100 circuits of a code "A", a total of 50 circuits of a code "B" and a total of 200 circuits of a code "C" to be each respectively prefabricated by a required completion date. The code "A" circuit comprises an electric wire of a code $W_A$ cut in a 50 mm length and a pair of solder-less terminals of a code $T_A$ either applied to both ends thereof. The code "B" circuit comprises an electric wire of a code $W_B$ cut in a 100 mm length and a pair of solder-less terminals of a code $T_B$ either applied to both ends thereof. The code "C" circuit comprises an electric wire of a code $W_C$ cut in a 70 mm length, a solder-less terminal of the code $T_A$ applied to a left or trailing end thereof, and a solder-less terminal of the code $T_B$ applied to a right or leading end thereof. Necessary data on the respective codes are readable from (a memory through) the wire specification master 12.

At a step S2 (strip length decision/entry), by reference to the strip length master 13, a specified data is input therefrom to determine a strip length for a respective terminal of a respective circuit. The determined strip length is stored as data for an associated work region.

At a step S3 (termination condition initialize for typical in-line work), the condition for circuit termination is initialized to a default value, which is set to the flag "2" (up to solder-less terminal application) for a convenient use to a typical circuit to be provided with solder-less terminals on both ends.

At a step S4 (termination condition update for usual off-line work), the termination condition initialized to the flag "2" (up to solder-less terminal application) is updated as necessary by reference to the cutting priority circuit master 14, to set up either the flag "Z" (up to a stripping for a manual application of solder-less terminal) or "4" (up to a cutting), and an associated priority condition is calculated in terms of a number of work days.

At a step S5 (termination condition update for off-lined particular solder-less terminal application), the termination condition is updated as necessary by reference to the wire specification master 12, to a particular flag for a double wire SL (solder-less terminal) application, which is a particular process off-lined from an EDS prefabrication machine 7 and covered with a wire doubling data under control of the master 12, for applying a single solder-less terminal irregular in configuration and size commonly to aligned respective stripped ends of a number of parallel circuits to be prefabricated with or without terminals at opposite ends thereof.

At a step S6 (cutting date calculation), a wire cutting startup time or date is calculated for each lot of circuits in consideration of the required prefabrication completion date and/or the priority condition, as necessary.

At a step S7 (work allotment), respective circuits as pieces of work recognized in the software system to be prefabricated on the identified machine nos. 01 to 03 by their completion dates or semi-prefabricated thereon in consideration of their priority conditions are allotted or patched individually or in lot by codes, in a "one-side cramming" manner in consideration of their cutting dates and codes representative of associated specifications, to or on available or unoccupied sub-regions of code-matching ones of respective work regions to be covered by a respective one of the machine nos. 01–03 , as the work regions are coded in accord with data of a corresponding one of the machine master 17 and developed in a form of end-less bands or tubes extending along a temporal axis in a virtual storage, with their variable widths or diameters defining potential quantities of work as areas or volumes corresponding to machine capacities or performances in terms of a number of circuits per unit time times a length of an available temporal section. For the "one-side cramming", the processor 11 allots to the machine no. 01 as many circuit lots or circuits of respective matching codes as possible until they fill up an available number of sub-regions of the machine no. 01's work region, before entering an allotment of the remaining circuit lots or circuits of any identical code to an available number of the machine no. 02's work region. If a total number of required circuits are of a kind, they will sequentially cram work regions of the machine nos. 01–03.

Then, a whole quantity of on-line fabrication work including an entire quantity of on-line prefabrication work is calculated for a variable temporal section, which normally is set to a seven working hours of a concerned day (i.e. a keyboarded working day or a designated day), so that at a beginning of each working day (or at a night therebefore) the work allotment processor 11 cuts out a whole field of work on a temporal axis range of the concerned day and computes the quantity of on-line prefabrication work in terms of a sum of respective total numbers of circuits to be prepared by the machines nos. 1–3 in the concerned day, besides the whole quantity of on-line fabrication work in terms of a sum of respective total numbers of coded EDS products to be output from the identified EDS fabrication machines in that day, for a check to a required delivery condition.

In this connection, the prefabrication completion date, wire cutting date and off-line work days as a priority condition are each roughly determined in terms of a calendar day (24 hours) with a sufficient allowance, on the basis of a total number of circuits developed from the order data and coded as described, and may be updated after a post-allotment check for a total area or volume of unoccupied sub-regions of each work region to be within lower and upper preset limits in view of a machine operation rate to be cost-effective and a required flexibility against emergencies and/or risk management. In this case, the processor 11 repeats the steps S1 to S7, subject to updated dates, without data entry and termination flag changes. For a time saving, a simple cramming may be simulated on data of the master file 15, the order file 16 and the machine masters 17 in view of the prefabrication instruction file 20, to determine a provisional prefabrication completion date, a provisional wire cutting date and a provisional priority condition at a sub-step of the step S1.

In any way, at an end of the step S7, the allotment processor 11 has a combination of: a first set of computed data on the entire quantity of on-line prefabrication work in a respective concerned day within a concerned temporal section which typically (i.e. for production of a great number of wiring harness products ordered for a standard type of automobile) corresponds to a time interval between a wire cutting startup date of special circuits with priorities and a prefabrication completion date of standard circuits, both inclusive; a second set of computed data on provisional fractions of the entire quantity to be allotted to the machine nos. 01–03 on the respective concerned day; and a third set of computed data on circuits to be prepared on a previous or subsequent day or earlier or later, i.e., on the remaining pieces of work not patched within a work field of the concerned temporal section.

At a step S8 (data distribution), the first and second sets of computed data are stored in (a memory under control of) the prefabrication instruction file 20, and the third set of computed data is stored in an additional production instruction file that controls prefabrication inhibiting instructions.

The foregoing steps S1 to S8 constitute an automatic work allotment process in which the work allotment processor 11 processes necessary data such as input data on quantities of ordered EDS products by product codes, data on prefabrication completion dates, registered data in the machine masters 17, registered data in the strip length master 13, and data on circuit configurations, off-line work days and termination conditions registered in the cutting priority circuit master 14, and prepares a volume of fabrication instructions, i.e., provides a set of complementary data for a circuit prefabrication section of a book of formatted EDS fabrication instructions which may be printed out as a hard copy for a respective identified EDS fabrication machine, as well as for a review.

Then, the automatic work allotment system 1 enters an interactive integrated control mode, using a combination of entered or input data and the computed data as a database and the virtual storage as a memo space, allowing for a load balance adjustment that is a voluntary re-allotment of concerned pieces of work within the work field of the concerned temporal section.

Figure 10:
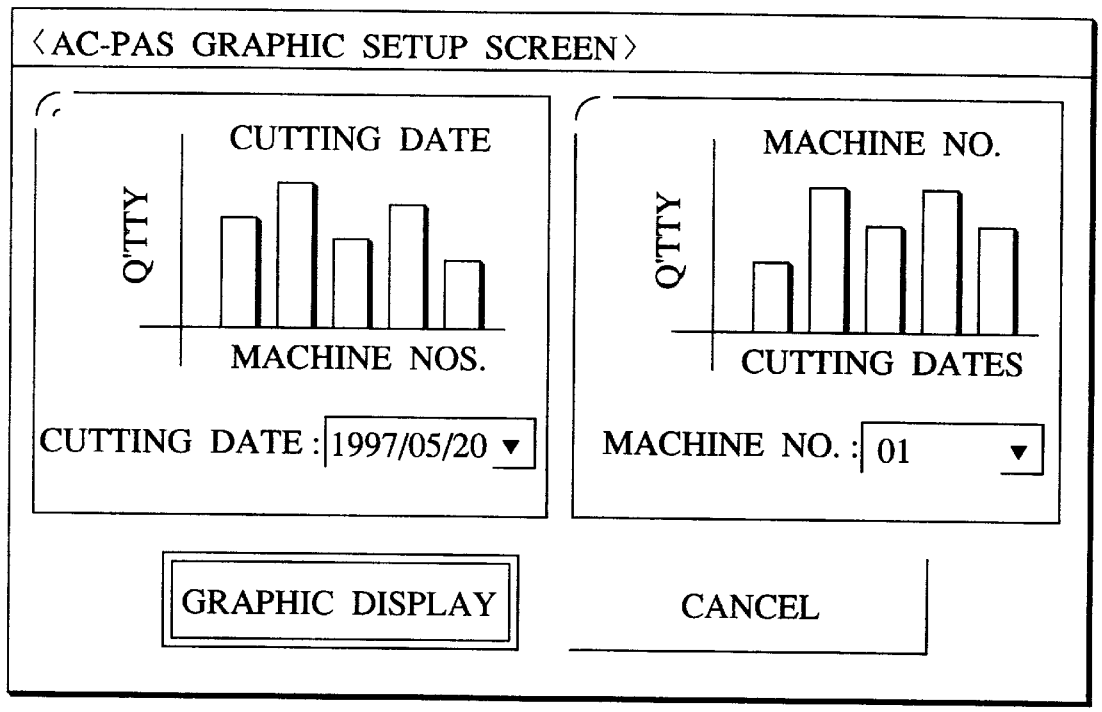
FIG. 10 is an illustration of a graphic setup screen of the automatic work allotment system of FIG. 1.

For the load balance adjustment, the system 1 provides a graphic presentation of a result of the work cramming allotment on a monitor screen of the personal computer 2. FIG. 10 illustrates an example of the graphic presentation, as it is eventually displayed in the form of a combination of left and right pictures. The left picture shows, for a wire cutting date May 20, 1997 keyboarded as a concerned day in a concerned temporal section containing a total of five working days, a graph of five histograms representing loads or work quantities as total numbers of circuits to be respectively prefabricated by a total of five available EDS fabrication machines, that are each equivalent to a total number of wire pieces to be cut in length by a corresponding one of the five machines including the machine nos. 01–03. The right picture shows, for a concerned machine (the no. 01 in this example), a graph of five histograms representing loads or work quantities in terms of a total number of circuits to be prepared in a corresponding one of the five working days. Each histogram comprises a number of piled components each color coded in accordance with an associated circuit code.

Figure 11:
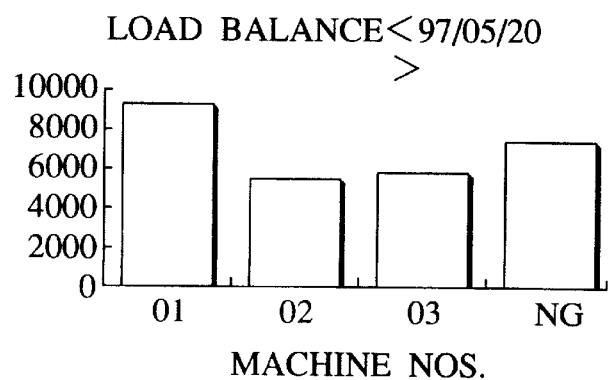
FIG. 11 is an exemplary histogram of work quantities allotted as machine loads on the graphic setup screen of FIG. 10.

FIG. 11 shows a graphically displayed load balance among the machine nos. 01–03 for a designated cutting date May 20, 1997. A rightmost load is not allotted to any of the machine nos. 01–03.

The machine no. 01 has an excessively larger load allotted thereto than either of the machine nos. 02–03. An operator can adjust the displayed load balance by executing a shift operation to transport a voluntary load portion from a donor machine to a receptor machine. The donor and receptor machines can be designated by keyboarding their machine nos. Upon designation of the donor and receptor machines, the monitor displays a load balance control screen.

Figures 12, 13:
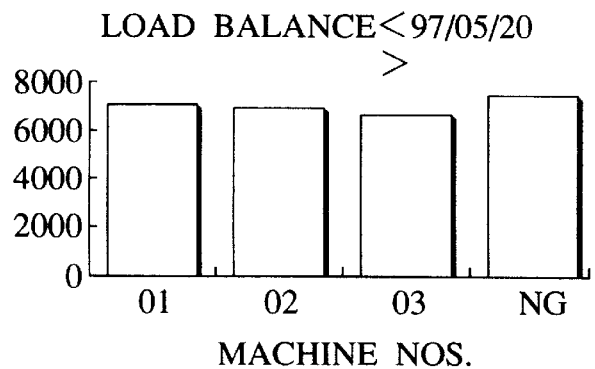
FIG. 12 is an illustration of a load balance control screen for re-allotment of work between designated machines.
FIG. 13 is an exemplary histogram of work quantities after re-allotment.

FIG. 12 illustrates an exemplary load balance control screen listing every pieces of work (i.e. quantity in lot and number of coded circuits) transportable from the machine no. 01 as a donor to the machine no.03 as a receptor, for a load balance control of a designated date. The operator may repetitively choose any work piece to be transported from the donor machine to the receptor machine, to achieve a desirable load balance. A total number of such operations constitute an interactive work re-allotment process in the software system.

FIG. 13 shows a load balance after such a re-allotment, where the machine nos. 01–03 have their loads balanced to be practically averaged flat therebetween. Data on the re-allotted loads are stored in the prefabrication instruction file 20, and may be directly supplied to controllers of the respective EDS fabrication machines.

As shown in FIG. 2, the automatic work allotment system 1 has a file 21 for controlling plan instructions, plan data control sequences, and Junkan (preparation completion)

control sequences such as for printing a preparation check sheet on a preparation completion date. A cutting check sheet and a final fabrication instruction book can also be output.

While preferred embodiments of the present invention have been described using specific terms, such description is for illustrative purposes, and it is to be understood that changes and variations may be made without departing from the spirit or scope of the following claims.

What is claimed is:

1. An automatic work allotment system for an EDS (electrical distribution system) production system including:
   a material supply section for supplying
      a plurality of types of electric wires and
      a plurality of types of terminals;
   an EDS fabrication section for fabricating a plurality of kinds of EDS products, the EDS fabrication section having a plurality of identified machines each adaptive for one or more performances to automatically execute one or more sub-regions of a work region for processing one or more types of electric wires to prefabricate one or more types of circuits employable, alone or in combination, to fabricate one or more kinds of EDS products, the one or more sub-regions of the work region including one of
      a first sub-region for cutting one or more specified types of electric wires in a variable wire length,
      a combination of
         the first sub-region and
         a second sub-region for stripping a cut wire of an insulating cover thereon over a variable strip length at one of either end and both ends thereof, and
      a combination of
         the first sub-region,
         the second sub-region and
         a third sub-region for applying a specified terminal to a stripped end of the cut wire; and
   a production control section for controlling a circuit quantity of a respective type of circuit to be prefabricated by a specified completion date therefor in consideration of a production quantity of a respective ordered EDS product to be completed within a delivery term thereof,
   the automatic work allotment system comprising:
      first master means for controlling a first set of data on specifications for the plurality of types of electric wires;
      second master means for controlling a second set of data on specifications for the one or more performances and the one or more sub-regions of the work region of each identified machine; and
      processor means cooperative with the first and second master means and the production control section for processing a combination of
         a subset of the first set of data,
         a subset of the second set of data and
         a third set of data covering the circuit quantity of the respective type of circuit and the specified completion date therefor to have allotted, to the plurality of identified machines, a plurality of fractions of an entirety of circuit fabrication work to be done within an arbitrary one of time sections of a concerned term to provide one or more necessary types of circuits in required circuit quantities by specified completion dates therefor, respectively.

2. The automatic work allotment system according to claim 1, wherein the one or more sub-regions of the work region further include a fourth sub-region interrupting work in one of the first, second and third sub-regions and a combination thereof, with a delay for applying an accessory to a semi-prefabricated circuit.

3. The automatic work allotment system according to claim 1 or 2, wherein the entirety of circuit prefabrication work is defined in terms of a total of respective numbers of circuits of the one or more necessary types of circuits to be prefabricated within the arbitrary time section.

4. The automatic work allotment system according to claim 3, wherein:
   the plurality of identified machines include
      a first identified machine adaptive for fabricating a first number of circuits within the arbitrary time section, and
      a second identified machine adaptive for fabricating a second number of circuits within the arbitrary time section; and
   the processor means allots to the first identified machine the first number of circuits as a first fraction of the entirety of circuit fabrication work, before allotting to the second identified machine a number of circuits as a second fraction of the entirety of circuit fabrication work.

5. The automatic work allotment system according to claim 3, wherein:
   the plurality of identified machines include
      a first identified machine adaptive for fabricating a first number of circuits of a first type of circuit within the arbitrary time section, and
      a second identified machine adaptive for fabricating a second number of circuits of the first type of circuit within the arbitrary time section; and
   the processor means allots the first number of circuits of the first type of circuit to the first identified machine, before allotting a number of circuits of the first type of circuit to the second identified machine.

6. The automatic work allotment system according to claim 1, wherein:
   the first master means comprises a first set of program files;
   the second master means comprises a second set of program files;
   the processor means comprise a third set of program files; and
   the automatic work allotment system further comprises one or more storage media for storing therein the first, second and third sets of program files.

7. An automatic work allotment system for allotting fabrication instructions obtained by developing input order data to a plurality of EDS (electrical distribution system) fabrication machines for fabricating in lots a plurality of kinds of electric wires to constitute EDS products, the automatic work allotment system comprising:
   a wire specification master for storing specified data on a variety of kinds of electric wires constituting the EDS products;
   a machine master having registered wire numbers and terminal numbers set to the plurality of EDS fabrication machines and performance values thereof;
   a strip length master having registered strip lengths in correspondence to the terminal numbers;
   a work allotment processor for preparing fabrication instructions on a circuit basis to the plurality of EDS fabrication machines in accordance with a combination of numbers of input orders by product numbers and an input prefabrication completion date, wire specification data registered to the wire specification master, data registered to the machine master, and data registered to the strip length master; and a cutting priority circuit master for master storing circuit configurations needing more than a usual number of days from a wire cutting to a prefabrication completion, numbers of working days therefor, and termination conditions of work to be done by cutting machines provided for the plurality of EDS fabrication machines and to be set as one of "terminal solder-less connection", "up to stripping" and "up to cutting".

8. The automatic work allotment system according to claim 7, further comprising:

the work allotment processor for preparing the fabrication instructions on the circuit basis to the plurality of EDS fabrication machines in accordance with the combination of the numbers of input orders by product numbers and the input prefabrication completion date, the data registered to the machine master, the data registered to the strip length master, and the circuit configurations, the numbers of working days and the termination conditions registered to the cutting priority circuit master.

9. The automatic work allotment system according to claim 7 or 8, further comprising a display processor for graphically displaying the fabrication instructions allotted by the work allotment processor to the plurality of EDS fabrication machines to visualize a load balance.

10. A storage medium with a stored automatic work allotment program having:

a circuit development process function for determining a number of orders, a prefabrication completion date and information on a lot number, respectively on a circuit basis, in accordance with input orders and wire specifications for a variety of electric wires constituting EDS (electrical distribution system) products;

a strip length decision process function for determining strip lengths of respective terminals with reference to a strip length master;

a termination condition decision process function for setting conditions of work to be done by cutting machines provided for a plurality of EDS fabrication machines as one of "terminal solder-less connection", "up to stripping" and "up to cutting";

a cutting date calculation process function for calculating cutting dates of respective electric wires in accordance with the determined prefabrication completion dates and termination conditions;

a cutting priority process function for storing circuit configurations needing more than a usual number of days from a wire cutting to a prefabrication completion, numbers of working days therefor, and the termination conditions; and a work allotment process function for preparing fabrication instructions on a circuit basis to the plurality of EDS fabrication machines in accordance with the calculated cutting dates and data on electric wires, terminals and accessories to be handled by machine types and respective machines registered to a machine master.

11. The storage medium with the stored automatic work allotment program according to claim 10, further having a display process function for graphically displaying the fabrication instructions to the plurality of EDS fabrication machines to visualize a load balance.

* * * * *

UNITED STATES PATENT AND TRADEMARK OFFICE
CERTIFICATE OF CORRECTION

PATENT NO. : 6,263,254 B1
DATED : July 17, 2001
INVENTOR(S) : Hisato Nishimura et al.

It is certified that error appears in the above-identified patent and that said Letters Patent is hereby corrected as shown below:

<u>Column 15,</u>
Line 7, before "storing circuit" delete "master".

Signed and Sealed this

Eighteenth Day of June, 2002

*Attest:*

*Attesting Officer*

JAMES E. ROGAN
*Director of the United States Patent and Trademark Office*